C. H. SLATTERY.
DASH POT FOR SHOCK ABSORBERS.
APPLICATION FILED MAR. 11, 1916.
1,214,719.
Patented Feb. 6, 1917.
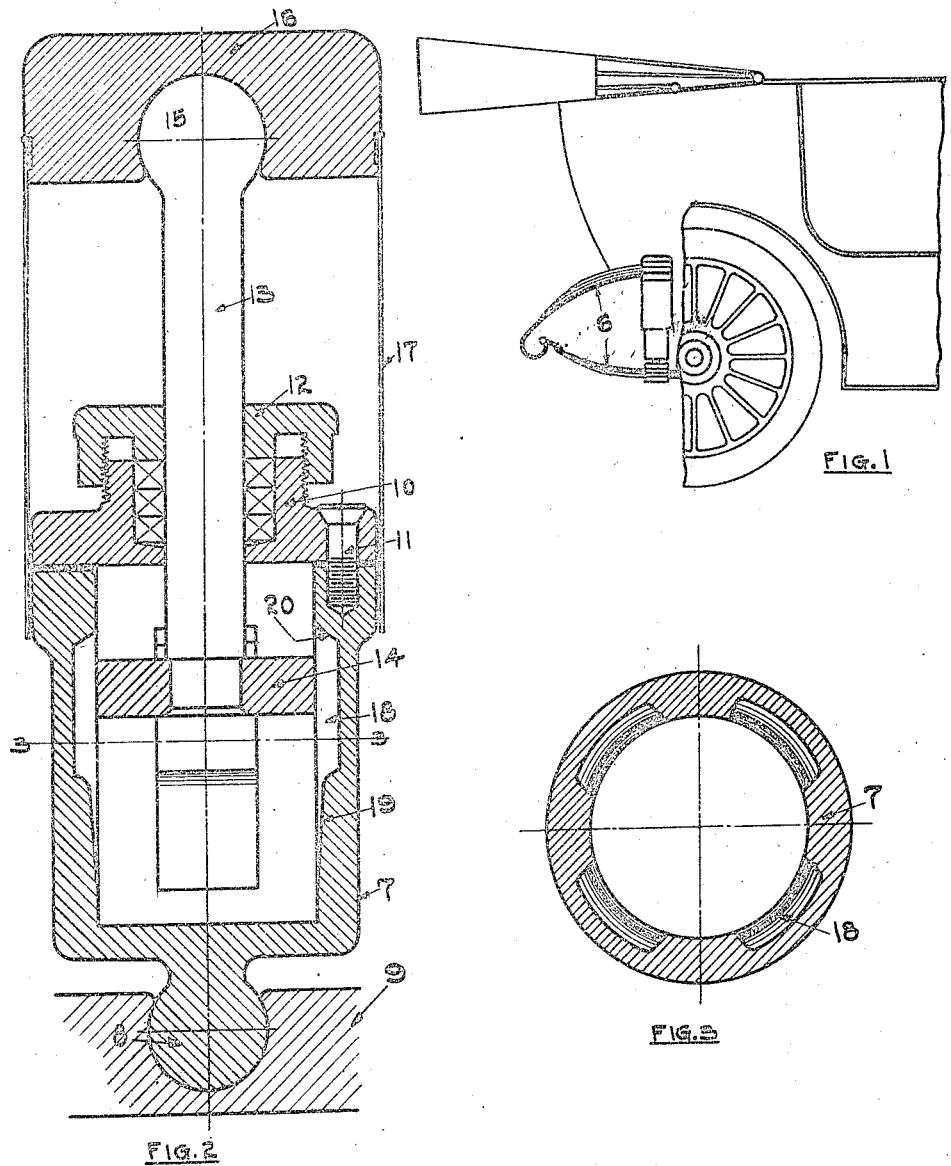

UNITED STATES PATENT OFFICE.

CHARLES H. SLATTERY, OF CUYAHOGA FALLS, OHIO.

DASH-POT FOR SHOCK-ABSORBERS.

1,214,719.  Specification of Letters Patent.  Patented Feb. 6, 1917.

Application filed March 11, 1916. Serial No. 83,670.

*To all whom it may concern:*

Be it known that I, CHARLES H. SLATTERY, citizen of the United States, residing at Cuyahoga Falls, in the county of Summit and State of Ohio, have invented certain new and useful Improvemnts in Dash-Pots for Shock-Absorbers, of which the following is a specification.

This invention relates to shock absorbers for vehicles, and has for its object to provide an improved shock absorber of the type employing a piston and cylinder, the latter being filled with liquid or other fluid and having one or more graduated ports or bypasses which will permit the liquid to flow from one side of the piston to the other, some or all of these ports are graduated, so that the resistance increases as the piston approaches the limit of its stroke, whereby the resistance increases as the piston hits the limit of its stroke in either direction, the fluid being finally trapped in the cylinder to prevent further movement of the piston.

The invention is capable of various modifications suitable for different types of springs, and is illustrated in connection with an elliptical spring between the upper and lower members in which the device is placed.

In the drawings, Figure 1 is a partial side elevation illustrating the device applied to a spring. Fig. 2 is a vertical section. Fig. 3 is a section on the line 3—3 of Fig. 2.

Referring specifically to the drawings, the spring members are indicated at 6, the shock absorber being located therebetween.

7 is a cylinder provided at one end with a ball 8 which fits in a socket in a lower attaching piece 9, to provide lateral play for the device. The cylinder is closed at the top by a head 10 secured by screws 11 and having a gland 12 through which works the rod 13 of the piston 14 in the cylinder. The upper end of the piston rod has a ball 15 which fits in a socket in a cap piece 16. The base and cap pieces 9 and 16 may be secured to the spring members in any suitable or convenient manner, or placed in other relations between the parts of the vehicle which are spring supported with respect to each other and which are movable toward and from each other according to the compression and expansion of the springs. For springs of the elliptic type, a convenient location is between the upper and lower members thereof. A casing 17 of flexible material extends between the cap 16 and the cylinder, to inclose the parts.

The inner surface of the wall of the cylinder 7 has one or more longitudinal channels or bypasses 18 therein. These are of special construction. At or about normal position of the piston they are relatively deep. At their lower ends they taper off or become shallower gradually as indicated at 19, until they finally merge into the surface of the cylinder wall. At the upper end they taper rather sharply to the surface as indicated at 20. As shown, all of the passages are tapered, but the number so tapered may be varied if desired.

As the piston works up and down the oil or other fluid in the cylinder will pass through the passages to opposite sides of the piston. The shape of the passages is such that the flow will be comparatively free during small or ordinary movements of the piston, and but little resistance will be offered to the spring action. Under special shock, when the piston is forced down beside the contracted part 19 of the passages the resistance to the flow will gradually increase and the spring action will be checked until finally, when the piston passes beyond the lower ends of the passages, the action will be practically stopped. On a rebound, the action will be free until the piston reaches the inclined parts 21, where the lift of the piston will be more suddenly checked, and finally stopped. Therefore the device will have comparatively little effect on the free action of the springs incident to slight irregularities in the road, but under excessive shock or rebound the action will be gradually checked, thereby preventing the breaking of the springs or unduly straining the same. The ball and socket joints at the top and bottom accommodate any lateral vibration incident to any slight shift of position of the connecting parts, and also permit the device to be set at a slight angle if desired.

What I claim as new is:

A dash pot for shock absorbers comprising a cylinder, and a piston therein, the inner wall of the cylinder having a channel traversed by the piston and adapted to by-pass fluid from one end of the cylinder to the other, said channel decreasing in area toward both ends of the cylinder, the decrease being relatively long and gradual toward one end of the cylinder and short and abrupt toward the other end thereof, said channel terminating short of each end of the cylinder.

In testimony whereof, I do affix my signature in presence of two witnesses.

CHARLES H. SLATTERY.

Witnesses:
W. W. SCUPHOLM,
GEORGE S. WOOTTON.